UNITED STATES PATENT OFFICE.

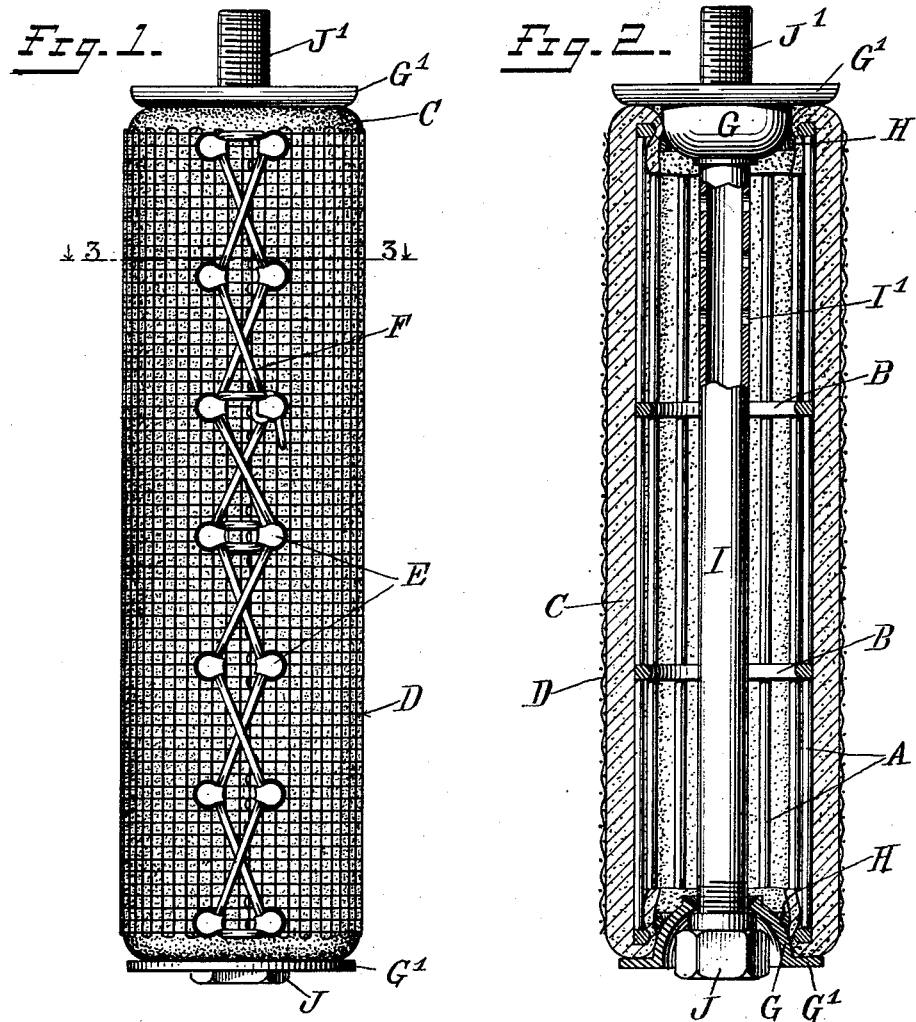

GEORGE M. KNEUPER, OF NEW YORK, N. Y.

FILTER-CELL.

934,076.

Specification of Letters Patent. Patented Sept. 14, 1909.

Application filed June 11, 1907. Serial No. 378,340.

*To all whom it may concern:*

Be it known that I, GEORGE M. KNEUPER, a citizen of the United States, and resident of the borough of Brooklyn, county of Kings, city and State of New York, have invented certain new and useful Improvements in Filter-Cells, of which the following is a specification.

My invention relates to filter cells and has for its object to provide a cell which is serviceable and simple in construction which can be easily and effectively cleaned and which is capable of accommodating varying thicknesses of filtering material.

Other objects of my invention will appear from the annexed description and the features of novelty will be pointed out in the appended claims.

Reference is to be had to the accompanying drawing in which—

Figure 1 is an elevation of my improved filter cell; Fig. 2 is a central sectional view thereof; Fig. 3 is a horizontal section in the line 3—3 of Fig. 1; Fig. 4 is a detail perspective view of one of the clamping rings; Fig. 5 is a detail sectional view of the wire jacket on an enlarged scale.

A represents the core which is composed of a number of spaced bars secured together by rings B, around which the filtering material C is wrapped, which filtering material extends over the ends of the core A to the inside thereof as clearly shown in Fig. 2.

D is a foraminated jacket which may be composed of a sheet of wire netting or other suitable material, the longitudinal edges of which are loose or unconnected and each provided with a series of hooks E. The edge portions are overlapped as shown in Fig. 5, one series of hooks being nearer the edge than the other. A lace F, preferably of an elastic material, is adapted to be laced through said hooks E to secure said adjacent ends of the jacket, the jacket thus serving to maintain the filtering material C in position on the core A. The ends of the core A take over cup-shaped end members G with the inwardly-folded ends of the filtering material between the said members G and the ends of the core A. Expansible clamping rings H which may be in engagement with the end members G, clamp the ends of the filtering material against the bars of the core A just inside of the two end rings B. The end members G are mounted on a pipe I, having perforations I'. These members G are also provided with flanges G' which serve to clamp the filtering material against the ends of the core A. The one end of the pipe I is closed as by a nut J and the other end is screw-threaded at J' for connection with the supply of liquid which is to be filtered. The nut J serves to force the two end members G toward each other and against the filtering material, it being understood that the upper member G is immovably secured to the pipe I.

In operation the liquid to be filtered enters the pipe I at the end J' and flows through the perforations I' to the interior of the filtering cell from which it passes between the bars of the core A out through the filtering material C and through the jacket D to the receiving chamber in which the cell is arranged, or the liquid may simply flow down the outer surface of the cell. As the filtering material becomes saturated with the liquid it has a tendency to expand, which expansion if not allowed for would tend to compress the fibers of the filtering material and thus render the filtering defective. By having the ends of the jacket D laced together as shown, this jacket gives somewhat as the filtering material expands and thus prevents an undue compression of the fibers of the filtering material. The wire jacket laced as described also allows a limited space for excursional motion of the filtering material which motion is of great service when the cell is to be cleaned by a pulsating reversed flow of cleansing medium. The above mentioned space is produced by the pressure of the liquid as it passes through the cell, this pressure exercising a strain on and consequently stretching the lace, increases the circumference of the jacket. The laced jacket also permits of the use of filtering material of varying degrees of thickness. The cell is also capable of being cleaned by rolling back and forth on a level surface under pressure of the hands in which case the jacket has a tendency to cause a frictional motion between the fibers which compose the filtering material, thereby causing every trace of impurities to be removed and insuring a very thorough cleansing of the cell. The jacket being practically a split cylinder can always be made to fit tightly around the covered core by simply relacing it from time to time so that the cells remain equal to new until all the filtering material has been brushed away by cleansing.

By making the core A of spaced bars the liquid passes freely to the filtering material and the danger of the cell becoming clogged is done away with.

Various modifications may be made without departing from the spirit of my invention as defined in the claims.

I claim:

1. A filtering cell comprising a cylindrical core composed of longitudinal bars and rings connecting them at intervals, a layer of filtering material surrounding said core and having its ends folded into the core, expansible clamping rings for holding said folded ends against the inner surface of the core, and a laced foraminated jacket on the outside of said filtering material.

2. A filtering cell comprising an apertured core, a layer of filtering material surrounding said core, a foraminated jacket on the outside of said filtering material and lacing to hold the jacket on said filtering material.

3. A filtering cell comprising an apertured core, a layer of filtering material surrounding said core, a foraminated jacket surrounding said filtering material and having unconnected longitudinal edges so that said edges may move toward and from each other, and means for holding said jacket on the filtering material.

4. A filtering cell comprising an apertured core, a layer of filtering material surrounding said core, a foraminated jacket surrounding said filtering material and having unconnected longitudinal edges so that said edges may move toward and from each other, hooks adjacent to said edges, and a lace extending through said hooks.

5. A filtering cell comprising an apertured core, a layer of filtering material surrounding said core, a foraminated jacket surrounding said filtering material and having unconnected longitudinal edges so that said edges may move toward and from each other, and lacing to hold the jacket on the filtering material.

6. A filtering cell comprising an apertured core, a layer of filtering material surrounding said core, a foraminated jacket surrounding said filtering material and having unconnected longitudinal edges so that said edges may move toward and from each other, and elastic lacing to hold the jacket on the filtering material.

7. A filtering cell comprising an apertured core, a layer of filtering material surrounding said core, a foraminated jacket having overlapping unconnected longitudinal edges, a series of fastening devices along each of said edges, and lacing engaged with said fastening devices.

8. A filtering cell comprising a core composed of spaced longitudinal bars and rings connecting them at intervals, a layer of filtering material surrounding said core and having its ends folded into the core, and expansible clamping rings for holding said folded ends against the inner surface of the core, said clamping rings being located between the end rings of the core.

In testimony whereof I have hereunto signed my name in the presence of two subscribing witnesses.

GEORGE M. KNEUPER.

Witnesses:
JOHN A. KEHLENBECK,
EUGENE EBLE.